United States Patent Office.

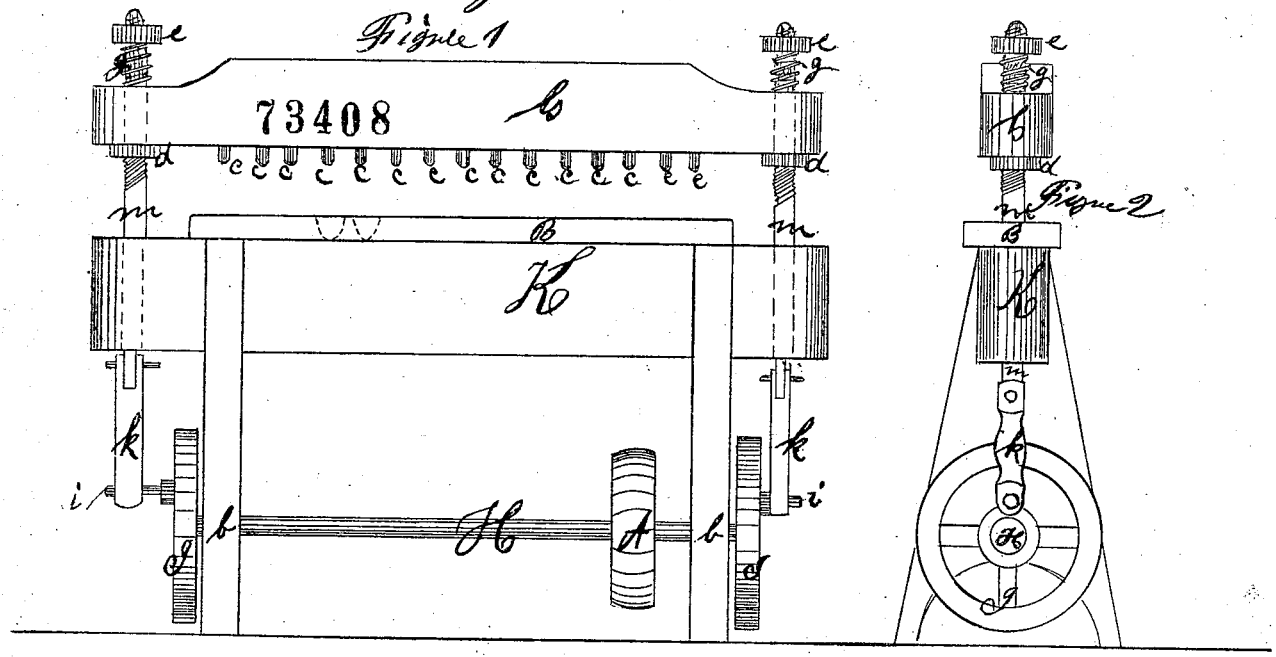
PATENTED
JAN 14 1868

JONATHAN TIDD, OF WOBURN, MASSACHUSETTS.

Letters Patent No. 73,408, dated January 14, 1868.

IMPROVED MACHINE FOR SOFTENING LEATHER AND HIDES.

*The Schedule referred to in these Letters Patent and making part of the same.*

TO ALL WHOM IT MAY CONCERN:

Be it known that I, JONATHAN TIDD, of Woburn, in the county of Middlesex, and State of Massachusetts, have invented a new and improved Machine for Softening Leather and Hides; and I hereby declare that the following is a full, clear, and exact description, which will enable those skilled in the art to make and use my invention, reference being had to the accompanying drawing, making part of this specification, in which—

Figure 1 is a side, and

Figure 2 an end elevation.

Figure 3 shows the under side of the cross-head G.

Figure 4, a top view of the bed B.

Figure 5, the under side of a grooved cross-head.

Figure 6, the top side of a grooved bed.

Figure 7, a side view of a grooved cross-head, with a corrugated or serpentine rib, $l$, instead of the pins $c$.

Figures 8 and 9 are end views of figs. 5 and 6.

This invention consists of a perforated bed, B, secured to the top of a supporting-beam, K, in combination with a yielding cross-head, G, and a series of pins, $c$, projecting downward from the under side thereof. Each perforation $a$ in the bed B is directly under a corresponding pin in the cross-head. A shaft, H, is arranged in bearings at or near the centre, and near the bottom of the framework, and on each end of this shaft is a balance-wheel, I, outside of the legs $b$, and on the same shaft, inside of and near one leg, is a pulley, A, to receive the belt which drives the machine. Projecting outward from each of the wheels I, are crank-pins or wrist-pins $i$, and the lower end of a pitman, $k$, connects with each pin $i$. The upper end of each pitman connects with the lower end of a vertical rod, $m$, which passes freely through a hole in the beam K, and extends upward through the cross-head G. These rods $m$ are screw-threaded from their upper ends downward to a little below the cross-head G, and the latter is connected with the rods $m$ by nuts $d$ beneath the cross-head, and by similar nuts, $e$, above. The nuts $d$ are for raising or lowering the cross-head to any desired point of adjustment, and the nuts $e$ are to screw down or up, and increase, release or diminish the action of the springs $g$, which are arranged between the nuts $e$ and the upper side of the cross-head G, so as to allow the latter to yield when the leather is placed on the perforated bed, beneath the cross-head and the pins $c$, the downward motion of which brings the lower ends of the pins into contact with the leather, pressing, forcing or bending certain portions of the leather, and in succession other portions, across the edges of the perforations $a$, thereby limbering and softening the leather to the desired degree, or in proportion to the time the leather is moved about between the perforated bed and the pins and cross-head while in motion or action.

Instead of perforated bed and the pins, I sometimes use a grooved bed and a grooved cross-head, shown in figs. 5, 6, 8, and 9, and either straight or corrugated or serpentine, horizontally, as in fig. 7, but I prefer the perforated bed and the pins for softening most kinds of leather and hides, as it requires less power, and has a tendency to enlarge the side or piece of leather or hide, by the peculiar operation of the pins and perforations drawing in every direction; whereas, in all previous modes of softening leather known by me, such as pounding the leather with a wooden mallet, when spread out on the tops of several pins, promiscuously disposed, the leather is considerably contracted or reduced in size, and very imperfectly and unequally softened.

I have found by experiment that leather which has been softened by the operation of my improved pins, cross-head, and perforated bed B, as described, will be enlarged in area nearly twenty per cent., and be much softer, more pliable, and hence more durable, than leather softened by any other method or device.

My improved machine is driven by a belt from some rotating pulley on to the pulley A, which rotates the shaft H and wheels or cranks I, through the medium of which, and the pitmen $k$ and rods $m$, the cross-head G and pins $c$ are moved up and down about two hundred strokes per minute. The leather or the hide is moved or fed along over the bed B, while the pins $c$ strike or press portions of the leather into the perforations, changing from one portion to another until the whole surface of the leather has been acted upon, and the entire side or piece of leather well and perfectly softened.

Having fully described my invention, what I claim as new, and desire to secure by Letters Patent, is—

1. A leather-softening machine, constructed and arranged to operate substantially as described for the purpose specified.

2. The perforated bed B, or its equivalent, and the pins c, or their equivalents, with the yielding cross-head G and the supporting-beam K, for the purpose and substantially as described.

3. The shaft H, wheels or cranks I, pitmen k and rods m, combined with the cross-head G, in the manner and for the purpose substantially as described.

4. The nuts d and e and springs g, combined with the rods m and the cross-head G, for the purpose and substantially as described.

JONATHAN TIDD.

Witnesses:
    JOHN E. CRANE,
    J. G. COLLINS.